United States Patent [19]

Sauer et al.

[11] Patent Number: 5,925,704
[45] Date of Patent: Jul. 20, 1999

[54] REINFORCED RUBBER DISPERSIONS, THEIR PREPARATION AND USE

[75] Inventors: Thomas Sauer, Haltern, Germany; Wolfgang Eck, Champaign, Ill.

[73] Assignee: Polymer Latex GmbH & Co. KG, Marl, Germany

[21] Appl. No.: 08/673,187

[22] Filed: Jun. 27, 1996

[30] Foreign Application Priority Data

Jul. 14, 1995 [DE] Germany .............. 195 25 736

[51] Int. Cl.$^6$ .................. C08F 2/16; C08F 25/02
[52] U.S. Cl. .......................... 524/458; 525/243
[58] Field of Search ............... 525/243; 524/458

[56] References Cited

U.S. PATENT DOCUMENTS

| | | | |
|---|---|---|---|
| 4,413,068 | 11/1983 | Sinclair et al. | 523/201 |
| 4,473,679 | 9/1984 | Falk et al. | 524/432 |
| 5,187,221 | 2/1993 | Schlueter et al. | 524/461 |
| 5,306,743 | 4/1994 | Klesse et al. | 523/201 |

FOREIGN PATENT DOCUMENTS

| | | |
|---|---|---|
| 0 187 242 | 7/1986 | European Pat. Off. . |
| 0 364 629 | 4/1990 | European Pat. Off. . |
| 0 390 144 | 10/1990 | European Pat. Off. . |
| 0 533 442 | 3/1993 | European Pat. Off. . |
| 0 540 942 | 5/1993 | European Pat. Off. . |
| 0 545 377 | 6/1993 | European Pat. Off. . |
| 0 644 205 | 3/1995 | European Pat. Off. . |
| 0 661 296 | 7/1995 | European Pat. Off. . |
| WO 86/00325 | 1/1986 | WIPO . |

*Primary Examiner*—Ana Woodward
*Attorney, Agent, or Firm*—Oblon, Spivak, McClelland, Maier & Neustadt, P.C.

[57] ABSTRACT

Aqueous, highly concentrated rubber dispersions, containing a reinforcing multiphase polymer dispersion comprising 60 to 95% by weight of aromatic monovinyl compounds and 40 to 5% by weight of aliphatic conjugated dienes having 4 to 9 carbon atoms, the particles of the reinforcing component consisting of a) 20 to 75% by weight of a hard inner phase having a glass transition temperature above 70° C., consisting of 90 to 100% by weight of aromatic monovinyl compounds and 10 to 0% by weight of aliphatic conjugated dienes having 4 to 9 carbon atoms, b) 78 to 15% by weight of a soft outer phase having a glass transition temperature below 20° C., consisting of 30 to 70% by weight of aromatic monovinyl compounds and 70 to 30% by weight of aliphatic conjugated dienes having 4 to 9 carbon atoms, and c) 2 to 10% by weight of transition regions between these phases, whose copolymer compositions are between those of the hard and of the soft phases.

7 Claims, No Drawings

REINFORCED RUBBER DISPERSIONS, THEIR PREPARATION AND USE

BACKGROUND OF THE INVENTION

1. Field of the Invention

The invention relates to aqueous rubber dispersions containing reinforcing multiphase polymer particles, which are used for the preparation of vulcanized latex foams having improved properties. In particular, the invention relates to dispersions of a reinforcing material which are prepared by a multistage emulsion polymerization process and have a predominant content or aromatic monovinyl compounds, the glass transition temperatures of the individual phases of the polymer particles being outside the temperature range in which the latex foams prepared therefrom are used.

2. Description of the Prior Art

Latex foam is prepared according to the prior art from aqueous, highly concentrated rubber dispersions with the addition of sulphur-crosslinking vulcanizing agents by mechanically beating in air, gelled by the addition of gelling agents and then vulcanized at elevated temperature to give a cellular substantially open-pore foam. The preparation of such latex foams is described, for example, in German Offenlegungsschrift 2,150,872. The rubber dispersions contain, as a rule, dispersions of a reinforcing material, i.e. aqueous dispersions of reinforcing polymers. The type and amount of this reinforcing component greatly influence the properties of the finished latex foam.

The latex foam is required to have high elasticity, in particular in the application temperature range of 20 to 70° C., which elasticity must not be lost even during prolonged compression and especially in continuous use. Accordingly, the compression set (according to DIN 53 572) in this temperature range should be as small as possible and the recovery of the compressed shaped article should be as rapid as possible, i.e. the hysteresis (according to DIN 53 577) should likewise be as small as possible. Furthermore, the tensile strength and the maximum elongation at break (according to DIN 53 571) should be as high as possible. Likewise, at a predetermined indentation hardness (according to DIN 53 576) of the foam, its density should be as low as possible in order to be able to produce the foam articles as economically as possible with regard to the amount of rubber dispersions which has to be used.

Reinforcing polymers in the form of their aqueous dispersion have long been known for increasing the hardness, strength and elongation of latex foam in a controlled manner. These are as a rule styrene/butadiene dispersions having a high styrene content of up to 100%. Homogeneous dispersions of a reinforcing material, i.e., said dispersions prepared in a single process step, have already been described in German Offenlegungsschrift 1,056,364 as being disadvantageous since they do not meet the requirement for low values for the compression set over a wide temperature range. According to this teaching, better results are obtained by the use of multistage graft copolymer dispersions which have a comparable overall composition and are prepared in a two-stage batch process. Such rubber dispersions and latex foams prepared therefrom are distinguished by the fact that the glass transition temperature to be assigned to the reinforcing component is within a relatively narrow temperature range in the stated interval from 20 to 70° C.

An embodiment of such a multiphase graft copolymer dispersion is described in European Patent 0,187,905, said embodiment being improved in important respects. There, use is made in particular of semicontinuous feed processes in order to prepare in a controlled manner dispersion particles having different monomer compositions in the individual phases. The latex foams prepared on the basis of this teaching are distinguished by a balanced combination of properties, with in particular low values for the compression set in the total temperature range from 20 to 70° C. According to this embodiment, and in contrast to earlier teachings, the glass transition temperatures to be assigned to the individual phases of the reinforcing component cover as broad a range as possible within the stated interval from 20 to 70° C. However, the poor resilience of the latex foams prepared according to this teaching is not completely satisfactory and is evident from the relatively high hysteresis values.

It is therefore an object of the present invention to provide dispersions of a reinforcing material for expandable rubber dispersions, with the aid of which dispersions it is possible to prepare latex foams which have a combination of properties which is improved over and above the prior art, and in particular have lower hysteresis values.

SUMMARY OF THE INVENTION

The invention relates to aqueous, highly concentrated rubber dispersions, a dispersion of a reinforcing multiphase polymer in the form of particles comprising overall 60 to 95% by weight of aromatic monovinyl compounds and 40 to 5% by weight of aliphatic conjugated dienes having 4 to 9 carbon atoms, the particles of the reinforcing component consisting of a) 20 to 75% by weight of a hard inner phase having a glass transition temperature above 70° C., comprising of 90 to 100% by weight of aromatic monovinyl compounds and 10 to 0% by weight of aliphatic conjugated dienes having 4 to 9 carbon atoms, b) 78 to 15% by weight of a soft outer phase having a glass transition temperature below 20° C., comprising of 30 to 70% by weight of aromatic monovinyl compounds and 70 to 30% by weight of aliphatic conjugated dienes having 4 to 9 carbon atoms, and c) 2 to 10% by weight of transition regions between these phases, whose copolymer compositions are between those of the hard and of the soft phases.

DETAILED DESCRIPTION OF THE INVENTION

The aqueous, highly concentrated rubber dispersions, which contain dispersions of a reinforcing material which are suitable as a reinforcing component, consist of multiphase polymer particles comprising hard and soft phases of copolymers of different composition and transition regions between these phases. "Hard" and "soft" relate to the position of the particular dynamic glass transition temperature relative to the usual room temperature. Methods for the determination of the dynamic glass transition temperature of elastomers are familiar to a person skilled in the art; their position can be determined, for example, from the result of measurements in torsional vibration analysis according to DIN 53 520. The overall composition of the reinforcing polymer dispersions according to the invention consists of 60 to 95% by weight of aromatic monovinyl compounds and 40 to 5% by weight of aliphatic conjugated dienes having 4 to 9 carbon atoms. A composition of 70 to 95% by weight of an aromatic monovinyl compound and 30 to 5% by weight of an aliphatic conjugated diene having 4 to 9 carbon atoms is preferred. However, the monomer compositions of the individual phases differ greatly from this overall composition.

For the purposes of the invention, aromatic monovinyl compounds are monomers of the general formula $CH_2=CR_1R_2$, where $R_1$ is an aromatic core having 6 to 10 carbon atoms, which may also be provided with further alkyl radicals and/or halogen substituents. $R_2$ is hydrogen or an alkyl radical having 1 to 4 carbon atoms. One or a mixture of such compounds can be used. For reasons of cost efficiency and availability, preferred aromatic monovinyl compounds are styrene, α-methylstyrene and vinyltoluene, styrene being particularly preferred.

Suitable aliphatic conjugated dienes having 4 to 9 carbon atoms are 1,3-butadiene and substituted butadienes, such as, for example, 2-chloro-1,3-butadiene. Conjugated, straight-chain and branched pentadienes and hexadienes and further straight-chain and branched conjugated dienes having up to 9 carbon atoms are also suitable. One or a mixture of such compounds can be used. Because of the cost-efficiency and the advantageous properties in copolymers, 1,3-butadiene is particularly preferred.

Further olefinically unsaturated, copolymerizable monomers may be used as required. For the purposes of the invention, however, it is preferable to use no further monomers. In particular, no olefinically unsaturated carboxylic acids or salts thereof are used.

The hard phase of the reinforcing polymer particles consists of 90 to 100% by weight of aromatic monovinyl compounds and 0 to 10% by weight of aliphatic conjugated dienes, based in each case on the total amount of the hard phase, styrene and 1,3-butadiene preferably being used as monomers. The composition of the hard phase is chosen so that the associated dynamic glass transition temperature is above 70° C. Preferably, however, it is desirable to achieve a glass transition temperature above 90° C. by means of an appropriately selected monomer mixture. However, a hard phase comprising pure styrene is most preferred. The amount of the hard phase as a proportion of the total polymer is between 20 and 75% by weight, preferably between 40 and 65% by weight.

The soft phase accordingly consists of the remaining mixture of aromatic monovinyl compounds and aliphatic conjugated dienes, which results after subtraction of the monomers used in the hard phase from the overall composition. In particular, however, the soft phase consists of 30 to 70% by weight of aliphatic conjugated dienes and 70 to 30% by weight of aromatic monovinyl compounds, based in each case on the total weight of the soft phase. The composition of the soft phase is chosen so that the associated glass transition temperature is below 20° C. Here too, styrene and 1,3-butadiene are preferably used as monomers. Preferably, however, it is desirable to achieve a glass transition temperature below 0° C. by means of an appropriately selected monomer mixture. Accordingly, a soft phase comprising 40 to 70% by weight of butadiene and 60 to 30% by weight of styrene, based in each case on the total amount of the soft phase, is preferred. The amount of the soft phase as a proportion of the total reinforcing polymer is between 78 and 15% by weight and preferably between 58 and 25% by weight.

The heterogeneous polymer particles of the dispersion of reinforcing material are based on a hard, cohesive phase which is prepared in a first process step. The soft phase is applied to the surface of the preferably spherical particles of the hard phase by polymerization in a second process step in such a way that no new particles are formed. Thus, very substantially only particles which contain both hard and soft phases are formed in the preparation process. They also contain transition regions between hard and soft phases, which, in terms of the composition of the copolymers contained therein, are between the compositions of the hard and soft phases, and which effect intimate binding of the different phases to one another. The amount of the transition regions as a proportion of the total reinforcing polymer is between 2 and 10% by weight.

The hard phase within a particle may be completely enclosed by the soft phase in the form of a shell, or the soft phase may be distributed in the form of individual or several regions over the surface of the hard phase. On the other hand, a composition of the heterogeneous particles in which the regions of the soft phase are dispersed within the hard phase is undesirable for the purposes of the invention. Just as undesirable is a structure in which the regions of the hard phase are dispersed in the soft phase.

The preparation of the heterogeneous dispersions of a reinforcing material is carried out by means of multistage emulsion polymerization processes in the aqueous phase as the dispersion medium. For the polymerization of the hard phase, the required amount of monomers is added in a feed process and emulsified in the aqueous phase with continuous vigorous stirring. Appropriate amounts of initiator and emulsifier are also added in a feed process in order to initiate the emulsion polymerization. Monomer and emulsifier can be added in the same manner also as an aqueous emulsion. Alternatively, a part of the corresponding monomers can be initially introduced with a matched amount of initiator and emulsifier and can be polymerized in a batch reaction. The remaining amounts of monomer, emulsifier and initiator for the hard phase are then metered in thereafter in the feed. The amounts of initiator, emulsifier and monomer should be matched with one another in such a way that the mean particle diameters of the hard phase are between 80 and 150 nm and preferably between 100 and 130 nm.

The reaction for the preparation of the hard phase is carried out, by a suitable choice of the reaction temperature, reaction time and feed times, in such a way that the monomer conversion at the end of this reaction is at least 90% and preferably more than 95%, but less than 98%. As a result of this incomplete conversion, residual monomer from the hard phase remains and polymerizes together with the subsequently added monomers of the soft phase to give a transition phase which ensures good adhesion between hard and soft phase.

With regard to amount and metering rate, the addition of the monomers of the soft phase is preferably designed so that the amount of the resulting transition regions is at least 2% by weight, but not more than 10% by weight, as a proportion of the total polymer. In particular, the transition phase should not be so pronounced that it appears as a separate phase in the determination of the glass transition temperatures of the reinforcing polymer.

The monomers for the soft phase are added completely or in individual batches to the latex of the hard phase or, in a preferred embodiment, are metered in a feed process. The amounts of initiator and emulsifier which have not yet been consumed up to this point are likewise added, preferably in semicontinuous feed, in such a way that no formation of new particles takes place during this feed. Rather, the aim is that the existing particles of the hard phase continue to grow. The reaction is carried out during the polymerization of the soft phase in such a way that the total conversion of the monomers at the end of the polymerization is at least 95%, but preferably more than 98%.

The dispersions, according to the invention, of a reinforcing material are stabilized using the customary fatty acid soaps and/or resin soaps which lead to dispersions having an increased pH value of between 8 and 11. Depending on the alkalinity of these emulsifiers, the polymerization also take place at these pH values. The content of emulsifier is between 0.5 and 10% by weight, based on the total amount of the monomers, preferably between 2 and 5% by weight.

0.05 to 2% by weight, based on the total amount of the monomers, of free radical initiators are used for the polymerization. Oil-soluble and/or water-soluble azo initiators, peroxides, hydroperoxides and peroxodisulphates are suitable for this purpose. In the polymerization at relatively high temperatures, peroxodisulphates are preferably used. If, on the other hand, polymerization is effected at a low temperature, peroxides and hydroperoxides in combination with a reducing agent are preferably used. Suitable reducing agents are, for example, sodium bisulphite, ascorbic acid and sodium formaldehyde sulphoxylate, preferably also in combination with an iron (II) salt. The polymerization temperature is 0 to 90° C., depending on the initiator system, preferably 60 to 85° C. when a peroxodisulphate is used as the initiator and preferably between 10 and 70° C. when a redox initiator system is used.

Furthermore, chain transfer agents may be used for regulating the molecular weight and the degree of crosslinking. Particularly preferred are aliphatic, straight-chain or branched mercaptans in an amount of 0.1 to 2% by weight, based on the total amount of the monomers.

The solids content of the dispersions, according to the invention, of a reinforcing material is between 30 and 70% by weight, preferably between 40 and 60% by weight. The mean particle diameter of the dispersions of a reinforcing material should be 100 to 250 nm at the end of the polymerization, preferably 140 to 250 nm.

The dispersions, according to the invention, of a reinforcing material are mixed with a rubber dispersion. The rubber dispersion may be a natural latex, a styrene/butadiene synthetic rubber latex (SBR latex) or a mixture of the two. Suitable SBR dispersions have undergone measures, familiar to persons skilled in the art, for agglomeration of the rubber particles. The content of reinforcing polymer is between 5 and 30% by weight, based on the total solids content of the mixture, and depends on the desired level of hardness of the latex foam to be prepared. The mixture of dispersion of a reinforcing material and rubber dispersion is then concentrated to solids contents of more than 60% by weight.

This foam latex is then expanded and vulcanized with the customary processing auxiliaries and further additives. In particular, further stabilizers, such as fat soaps and/or resin soaps, antiaging agents and light stabilizers, thickeners and organic and/or inorganic fillers (for example chalk or starch), may be added as further additives. Such foams are advantageous for the backing of textile floor coverings and for the production of shaped foam articles of all types and in particular for the production of latex mattresses. In these articles, the foam of the dispersions according to the invention exhibits a very substantially temperature-independent compression set at a low level and low hysteresis values, in combination with good hardness, strength and elongation. Compared with the dispersions of a reinforcing material which are described in the prior art, it is possible to use 10 to 15% less of the dispersions, according to the invention, of a reinforcing material, in order to obtain equivalent articles and coatings with the same foam density, with the result that the economic benefit of these dispersions is further increased.

Having generally described this invention, a further understanding can be obtained by reference to certain specific examples which are provided herein for purposes of illustration only and are not intended to be limiting unless otherwise specified.

EXAMPLE 1

Preparation of a dispersion, according to the invention, of a reinforcing material, of a reinforced rubber dispersion and of shaped foam articles produced therefrom In a pressure-resistant polymerization reactor, an emulsion comprising 84 parts of demineralized water, 0.2 part of potassium oleate, 0.1 part of potassium carbonate, 0.0015 part of the tetrasodium salt of ethylenediamine tetracarboxylic acid, 20 parts of styrene and 0.1 part of ammonium peroxodisulphate is prepared and is heated at 80° C. for 2 hours with vigorous stirring. The following streams are metered into this initially introduced mixture:

1: Mixture of 36 parts of styrene and 0.09 part of tert-dodecyl mercaptan (feed time 2 hours)

2: Mixture of 0.15 part of ammonium peroxodisulphate and 5.9 parts of demineralized water (feed time 6.5 hours)

3: Mixture of 4. parts of potassium oleate and 18.9 parts of demineralized water (feed time 5.5 hours)

4: Mixture of 22 parts of styrene, 22 parts of 1,3-butadiene and 0.06 part of tert-dodecyl mercaptan (feed time 3 hours)

The streams 1 to 3 are started simultaneously. After the end of stream 1, the reaction is continued for 0.5 hour. The latex obtained by this time has a conversion of about 98% and a mean particle diameter of 120 nm. Stream 4 is then started. After the end of the polymerization, a latex having a solids content of about 50% by weight and a mean particle diameter of 150 nm is obtained.

The preparation of a synthetic rubber dispersion containing about 25% by weight of styrene and 75% by weight of 1,3-butadiene is carried out similarly to DE 26 45 082, Example 1. This dispersion is then agglomerated by the process according to DE 12 13 984, freed from residual monomers, mixed with 19 parts of a dispersion of a reinforcing material per 100 parts of rubber dispersion (based in each case on the solids content of the particular dispersion) and then concentrated. A reinforced rubber dispersion having a solids content of 67.9% by weight and a Brookfield viscosity of 1770 mPas is obtained.

Based in each case on 100 parts of dispersion solid, 0.75 part of potassium oleate (as a 17.5% strength aqueous solution) and 0.25 part of carboxymethylcellulose (as a 2.5% strength aqueous solution) and a vulcanization system consisting of 2 parts of sulphur
1 part of zinc diethyldithiocarbamate
1 part of zinc 2-mercaptobenzothiazole
1 part of diphenylguanidine
3 parts of zinc oxide
1 part of antioxidant as a 50% strength aqueous dispersion, are added to the reinforced rubber dispersion. This vulcanizable material is expanded with air in a foam mixer to give a wet foam, two parts of sodium silicofluoride (as a 25% strength aqueous dispersion) are added and the mixture is poured into a mold. Gelling and vulcanization are carried out in steam at 100° C. in the course of 30 minutes. The latex foam obtained is then washed and is dried for 16 hours at 75° C. and, with a hardness of 270±10 N and a density of 100 g/l, gives the following measured values:

Compression set according to DIN 53 572
72 hours at 25° C.: 4.9%
22 hours at 50° C.: 5.4%

Hysteresis according to DIN 53 577: 25.6%

According to torsional vibration analysis (according to DIN 53 520), the dynamic glass transition temperatures to be assigned to the reinforcing component are 21° C. and 96° C.

Comparative Example

Preparation of a prior-art dispersion of a reinforcing material, of a rubber dispersion reinforced therewith and of shaped foam parts produced therefrom According to the teaching of EP 0 187 905, Example 1, a graft copolymer reinforcing latex having an overall composition of 80 parts of styrene and 20 parts of butadiene is prepared at a polymerization temperature of 80° C. After the end of the polymerization, a latex having a solids content of about 50% by weight and a mean particle diameter of 155 nm is obtained.

23 parts of this dispersion of a reinforcing material are mixed with 100 parts of a rubber dispersion (based in each case on the solids content of the particular dispersion) according to Example 1 and concentration is then carried out. A reinforced rubber dispersion having a solids content of 68.5% by weight and a Brookfield viscosity of 1700 mPas is obtained.

This reinforced rubber dispersion is converted, according to Example 1, into shaped foam parts which have the same hardness and density and give the following measured values:

Compression set according to DIN 53 572
72 hours at 25°: 7.7%
22 hours at 50°: 10.9%

Hysteresis according to DIN 53 577: 36.8%

According to torsional vibration analysis (according to DIN 53 520), the dynamic glass transition temperatures to be assigned to the reinforcing component are 28° C. and 67° C.

Comparison of the Examples shows the clearly better values of the rubber dispersions reinforced according to the invention.

German priority application 195 25 736.7, filed Jul. 14, 1995, is hereby incorporated by reference.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. An aqueous dispersion comprising, a reinforcing multiphase polymer in the form of particles comprising overall 60 to 95% by weight of an aromatic monovinyl compound and 40 to 5% by weight of an aliphatic conjugated diene having 4 to 9 carbon atoms, the particles of the reinforcing component comprising a) 20 to 75% by weight based on the total polymer of a hard inner phase polymer having a glass transition temperature above 70° C., said polymer of the hard phase being formed of monomers comprising 90 to 100% by weight of an aromatic monovinyl compound and 10 to 0% by weight of an aliphatic conjugated diene having 4 to 9 carbon atoms based in each case on the total amount of the total weight of the hard phase, b) 78 to 15% by weight based on the total polymer of a soft outer phase polymer having a glass transition temperature below 20° C., said polymer of the soft phase being formed of monomers comprising 30 to 70% by weight of an aromatic monovinyl compound and 70 to 30% by weight of an aliphatic conjugated diene having 4 to 9 carbon atoms based in each case on the amount of the total weight of the soft phase, and c) 2 to 10% by weight based on the total polymer of transition regions between these phases, comprising a polymer having a composition between said polymer of the hard and said polymer of the soft phases.

2. The aqueous rubber dispersion according to claim 1, wherein the glass transition temperature of the hard inner phase of the reinforcing polymer is above 90° C. and the glass transition temperature of the soft outer phase of the reinforcing polymer is below 0° C.

3. The aqueous rubber dispersion according to claim 1 wherein the aromatic monovinyl compound is styrene and the aliphatic conjugated diene is 1,3-butadiene.

4. The aqueous rubber dispersion according to claim 2 wherein the aromatic monovinyl compound is styrene and the aliphatic conjugated diene is 1,3-butadiene.

5. The aqueous rubber dispersion according to claim 1 wherein the hard inner phase of the reinforcing polymer consists of pure polystyrene.

6. The aqueous rubber dispersion according to claim 2 wherein the hard inner phase of the reinforcing polymer consists of pure polystyrene.

7. The aqueous rubber dispersion according to claim 3 wherein the hard inner phase of the reinforcing polymer consists of pure polystyrene.

* * * * *